Sept. 17, 1940.   O. L. MATCHETT   2,214,885
TIRE GROOVER
Filed April 28, 1939
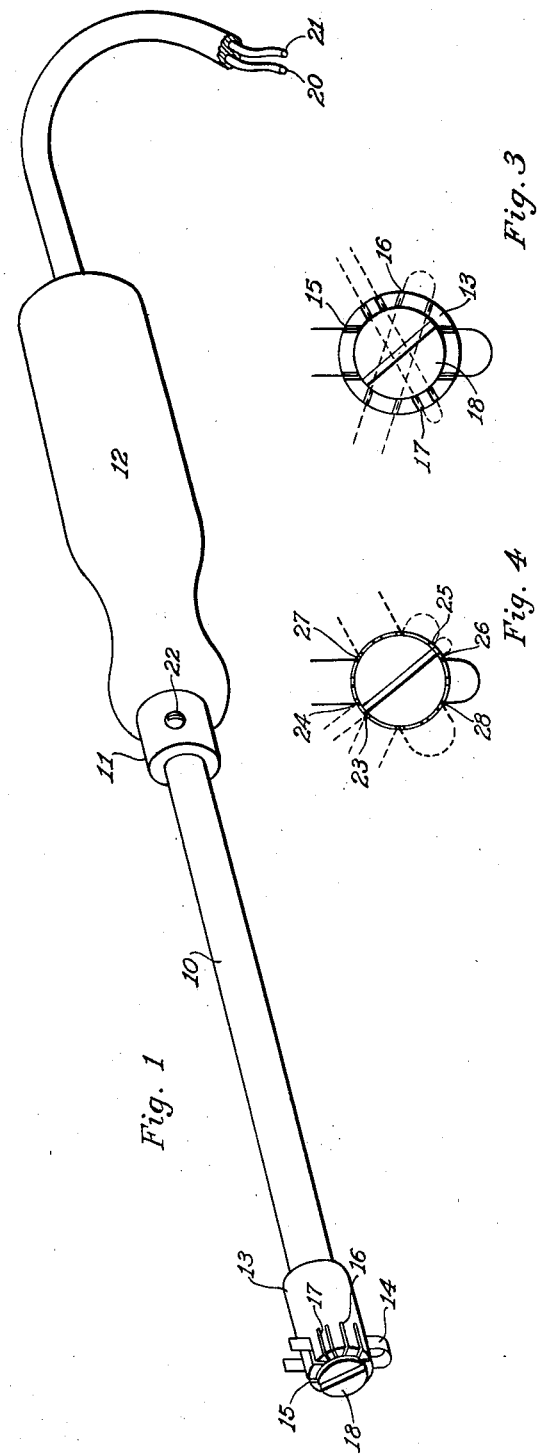
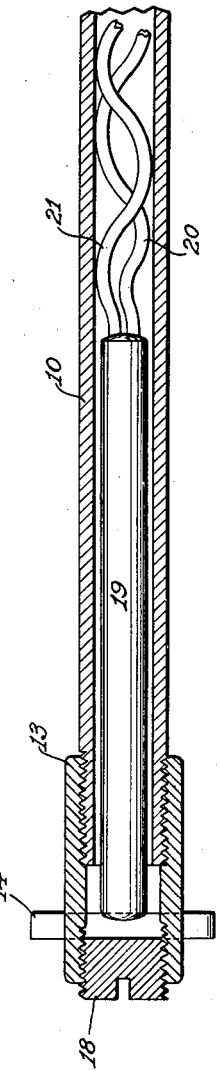
Inventor
Otis L. Matchett
By T. J. Geisler and
L. A. Geisler
Attorneys Patented Sept. 17, 1940

2,214,885

UNITED STATES PATENT OFFICE 2,214,885

TIRE GROOVER

Otis L. Matchett, Portland, Oreg.

Application April 28, 1939, Serial No. 270,559

10 Claims. (Cl. 30—140)

This invention relates to tools for making grooves in tires, particularly to hand operated devices for regrooving the treads of worn tires, or newly vulcanized portions of tires, for the purpose of re-establishing the non-skid property of the tire.

A number of hand operated devices for grooving tires have previously been produced. It is customary in such devices to provide a U-shaped knife or cutter blade and a heating element, since it is well known that the heating of the cutting blade facilitates the cutting or grooving of the rubber surface of the tire. My invention also employs a U-shaped cutting blade and an electric heating element associated therewith, and to this extent resembles other devices of this class. However, the object of this invention is to provide an improved form of tire groover which will be more practical, simpler in construction and easier to manipulate than any of those heretofore in use.

A further object of this invention is to provide a tire groover in which the cutting blade can easily be adjusted for the purpose of cutting grooves of different widths and different depths, but in which the cutting blade will always be centrally located in its holder.

Another object of this invention is to provide a device in which the heating element will always be in direct contact with the cutter blade itself, during the cutting operation, and in which it will not, therefore, be necessary for the heat from the heating element to be conducted thru any intermediate member or portion of the cutter holder in order to reach the cutting blade.

A further object of this invention is to provide a mounting for the cutting blade and the heating element which will be of such size, shape and arrangement as to obscure as little of the tire surface as possible in order that the operator may better observe the action of the cutter and may more easily follow any desired marking on the tire surface when manipulating the tire groover.

These objects, as well as incidental objects, I have been able to attain by making a tire groover in the manner hereinafter to be described with reference to the accompanying drawing.

In the drawing:

Fig. 1 is a perspective view of my tire groover;

Fig. 2 is a fragmentary longitudinal section taken thru the cutter blade holder and shank and drawn to a larger scale;

Fig. 3 is an end view of the cutter blade holder also drawn to a larger scale and illustrating certain details of construction; and Fig. 4 illustrates a slight modification in the blade holder.

One end of a tubular metal shank 10 is securely fixed, by means of a ferrule 11, in a handle 12, the handle 12 being made preferably of any suitable heat insulating material. The other end of the tubular shank 10 is externally threaded to receive the internally threaded tubular head or chuck 13 which carries the cutter blade 14. The cutter blade 14 is made of a single piece of tempered spring steel bent in U-shape and having one or both edges beveled to provide a sharp cutting edge.

The manner in which this U-shaped cutter blade 14 is carried in the chuck 13 constitutes an important feature of my invention. Several sets of slots 15, 16 and 17 (see Fig. 3) are provided in the outer end of the chuck 13. These slots are all made parallel to the axis of the chuck and shank, and each set of slots comprises two diametrically alined pairs of parallel slots as shown. The several sets of slots are symmetrically arranged in the shell of the chuck 13 and the spacing of the slots in each set is different so as to constitute means for mounting the cutter blade for cutting several effective groove widths. Three separate sets of slots, providing a considerable range in the effective cutting widths, are illustrated in Fig. 3. To change the effective cutting width of the tire groover it is necessary, therefore, merely to remove the blade from one set of slots and insert another blade, formed to cut the sized slot desired, in the appropriate slots. The blade 14 is firmly held in the slots of the chuck 13 by a screw plug 18 threaded in the outer end of the chuck so that the flat inner face of this screw plug 18 will bear against the adjacent edges of the blades and press the blade against the inner ends of the chuck slots.

The effective cutting depth of the cutter blade 14 may also be easily adjusted merely by loosening the screw plug 18, moving the cutter blade to the desired position for the effective depth of the groove, and then again tightening the screw plug 18. Thus the screw plug 18 threaded in the slotted chuck 13 constitutes a very simple and efficient device for clamping the cutter blade in the chuck and holder, making all adjustments of the tire groover a very quick and simple operation.

It will be apparent from Fig. 1 that the positioning of the cutter blade close to the end of the holder, the omission of any projecting fingers or parts on the end of the holder, and the small compact form in which it is possible to make the end of the holder, considerably increase the visibility of the work during the cutting operation. This I have found to be a considerable advantage over the tire groovers at present in public use.

Another important advantage afforded by my tire groover resides in the fact that the heating element 19, which is located in the shank 10, has its end in direct contact with the cutter blade 14. This makes it possible to heat the cutter blade quickly and also produce the most effective heating of the cutter blade, since it is not necessary for the heat from the heating element to be conducted thru any intermediate or interposed parts of the blade holder, as is customary with ordinary tire groovers in present use. The bore of the tubular shank 10, while preferably kept as small as practical, is made of the proper diameter to permit a suitable heating element 19 to be slid therein. The heating element 19 may be of any type of electric heating element connected to a source of electric energy thru conductors 20 and 21. The conducting wires 20 and 21, furthermore, are coiled, so to speak, inside the tubular shank 10, substantially as shown in Fig. 2, and are clamped against endwise movement rearward thru the handle 12 by any suitable means such as a set screw 22 threaded into the ferrule 11. This coiling of the conductors 20 and 21 within the end of the shank opposite the cutter blade exerts a longitudinal thrusting force on the heating element 19, similar to that of a light compression spring, due to a certain amount of inherent resistance to bending offered by the wires constituting the conductors. As a result there is a constant longitudinal thrust on the heating element which serves to keep the forward end of the heating element in abutment with the cutting blade whenever the latter is secured in place. A separate compression spring could be inserted in the shank 10 between the heating element and the ferrule 11 to hold the heating element against the cutting blade, but, with the coiling of the conductor wires as described, I have not found it necessary to use any additional compression spring for the purpose mentioned.

In Fig. 4 the shell of the chuck 22 is made much thinner at the slotted end. The slots are wider and are cut radially. With such arrangement it is possible to use various combinations of slots and thus provide slots for cutting blades of a greater variety of effective cutting widths. Thus, as illustrated in Fig. 4, a cutter blade of a certain cutting width can be inserted in the slots 24, 27, 26 and 28, while the same slots 26 and 24 combined with slots 23 and 25 would support a smaller cutter blade; and, similarly, the slots 27 and 28 combined with other slots will support another sized cutter blade.

Minor modifications might, of course, be made in my tire groover without departing from the principles of my invention and without interfering with its efficiency or simplicity. Thus the shank 10 might be of rectangular or oval cross-section instead of circular cross-section, and, similarly, the chuck 13 might be made in any number of different shapes. However, I consider it preferable to have both the tubular shank and the chuck cylindrical in shape, and the form in which I have shown and described my device I have found to be entirely adequate for practical use. It is not my intention to limit my invention otherwise than as set forth in the claims.

I claim:

1. In a tire groover, a tubular member, one end of said member provided with longitudinal slots, said slots arranged parallel to each other and to the axis of said tubular member, a U-shaped cutter blade adapted to be inserted in said slots, means for holding said cutter blade firmly against the inner end walls of said slots, an electric heating element extending within said tubular member beyond said slots, one end of said heating element placed in contact with said blade.

2. In a tire groover, a tubular member, one end of said member provided with multiple sets of four slots, said slots extending parallel to the axis of said tubular member, a U-shaped cutter blade adapted to be inserted in each set of said slots, said slots arranged in diametrically opposite pairs whereby the straight portions of said blade will be held in said slots equidistant from the axis of said tubular member, the spacing of said slots being different in each set, means for holding said cutter blade against the inner end walls of said slots, and an electric heating element having an end located within said tubular member adjacent and in direct contact with said blade.

3. In a tire groover, a hollow shank, a cylindrical chuck at the end of said shank, said chuck provided with slots, said slots extending parallel to the axis of said chuck, a U-shaped cutter blade adapted to be inserted in said slots, said slots arranged in diametrically opposite pairs whereby the straight portions of said blade will be held in said slots equidistant from the axis of said chuck, a screw plug in the end of said chuck adapted to press against said cutter blade to hold said cutter blade in place.

4. In a tire groover, a hollow shank, a cylindrical chuck at the end of said shank, said chuck provided with multiple sets of slots, said slots extending parallel to the axis of said chuck and shank, a U-shaped cutter blade adapted to be inserted in each set of said slots, said slots arranged in diametrically opposite pairs whereby the straight portions of said blade will be held in said slots equidistant from the axis of said chuck, the spacing of said slots being different in each set, said sets of slots symmetrically arranged in the end of said chuck, removable means for securing said cutter blade in place in said slots.

5. In a tire groover, a hollow shank, a handle secured to one end of said shank, a hollow cylindrical chuck at the other end of said shank, said chuck provided with multiple sets of slots, said slots extending parallel to the axis of said chuck, a U-shaped cutter blade adapted to be inserted in each set of said slots, the spacing of said slots being different in each set, said sets of slots symmetrically arranged in the end of said chuck, a screw plug in the end of said chuck adapted to press against said cutter blade to hold said cutter blade in place.

6. In a tire groover, a tubular holder having a handle at one end, the other end of said holder provided with slots, a U-shaped cutter blade adapted to be inserted in said slots, removable means for securing said cutter blade in place in said slots, an electric heating element within said tubular holder, one end of said heating element in abutment with said blade, resilient means for holding said heating element against said blade.

7. In a tire groover, a tubular holder, a hollow chuck at the end of said tubular holder, said chuck provided with slots, a U-shaped cutter blade adapted to be inserted in said slots, a screw plug in the end of said chuck adapted to press against said cutter blade to hold said cutter blade in place, an electric heating element slidably mounted within said tubular holder, one end of said heating element in abutment with said blade, resilient means for holding said heating element against said blade.

8. In a tire groover, a hollow shank, a hollow cylindrical chuck at the end of said shank, said chuck provided with multiple sets of slots, said slots extending parallel to the axis of said chuck, a U-shaped cutter blade adapted to be inserted in each set of said slots, said slots arranged in diametrically opposite pairs whereby the straight portions of said blade will be held in said slots equidistant from the axis of said chuck, the spacing of said slots being different in each set, said sets of slots symmetrically arranged in the end of said chuck, a screw plug in the end of said chuck adapted to press against said cutter blade to hold said cutter blade in place.

9. In a tire groover, a tubular holder, one end of said holder provided with slots, a U-shaped cutter blade adapted to be inserted in said slots, a screw plug in the end of said tubular holder adapted to press against said cutter blade to hold said cutter blade in place, an electric heating element slidably mounted within said tubular holder, one end of said heating element in abutment with said blade, resilient means for holding said heating element against said blade.

10. A tire groover comprising a hollow shank, a handle secured to one end of said shank, a hollow cylindrical chuck at the other end of said shank, said chuck provided with multiple sets of slots, said slots extending parallel to the axis of said chuck and shank, a U-shaped cutter blade adapted to be inserted in each set of said slots, said slots arranged in diametrically opposite pairs whereby the straight portions of said blade will be held in said slots equidistant from the axis of said chuck and shank, the spacing of said slots being different in each set, a screw plug in the end of said chuck adapted to press against said cutter blade to hold said cutter blade in place, an electric heating element within said shank, one end of said heating element in abutment with said blade, means for holding said heating element against said blade.

OTIS L. MATCHETT.